United States Patent
Lim et al.

(10) Patent No.: US 11,434,140 B2
(45) Date of Patent: Sep. 6, 2022

(54) HIERARCHICAL ZEOLITES AND PREPARATION METHOD THEREFOR

(71) Applicants: SK Innovation Co., Ltd., Seoul (KR); SK Lubricants Co., Ltd., Seoul (KR)

(72) Inventors: Seon-Ju Lim, Daejeon (KR); Tae-Jin Kim, Daejeon (KR); Young-Eun Cheon, Daejeon (KR)

(73) Assignees: SK Innovation Co., Ltd., Seoul (KR); SK Lubricants Co., Ltd., Seoul (KR)

(*) Notice: Subject to any disclaimer, the term of this patent is extended or adjusted under 35 U.S.C. 154(b) by 0 days.

(21) Appl. No.: 17/277,822

(22) PCT Filed: Sep. 20, 2019

(86) PCT No.: PCT/KR2019/012216
§ 371 (c)(1),
(2) Date: Mar. 19, 2021

(87) PCT Pub. No.: WO2020/060274
PCT Pub. Date: Mar. 26, 2020

(65) Prior Publication Data
US 2021/0347647 A1    Nov. 11, 2021

(30) Foreign Application Priority Data

Sep. 21, 2018  (KR) .................. 10-2018-0114203

(51) Int. Cl.
*C01B 39/04* (2006.01)
*C01B 39/48* (2006.01)

(52) U.S. Cl.
CPC .............. *C01B 39/04* (2013.01); *C01B 39/48* (2013.01); *C01P 2002/72* (2013.01)

(58) Field of Classification Search
CPC .. C01B 39/48; C01P 2006/12; C01P 2006/14; B01J 29/703
See application file for complete search history.

(56) References Cited

U.S. PATENT DOCUMENTS

| | | | | |
|---|---|---|---|---|
| 4,741,891 A * | 5/1988 | Casci | ............ | B01J 29/70 423/326 |
| 8,815,200 B2 * | 8/2014 | Landry | ............ | B01J 20/28083 423/335 |
| 9,687,028 B2 * | 6/2017 | Park | ............ | A24F 40/42 |
| 10,974,231 B2 * | 4/2021 | Cheon | ............ | B01J 35/1019 |
| 2002/0090337 A1 * | 7/2002 | Corma Canos | ....... | C01B 39/445 423/700 |
| 2007/0134152 A1 * | 6/2007 | Caullet | ........... | C01B 39/48 423/700 |
| 2009/0156389 A1 | 6/2009 | Ryoo et al. | | |
| 2011/0039102 A1 | 2/2011 | Chaumonnot et al. | | |
| 2012/0202006 A1 * | 8/2012 | Rimer | ............ | C01B 39/40 428/131 |
| 2015/0122124 A1 | 5/2015 | Kwon et al. | | |
| 2016/0167030 A1 * | 6/2016 | Levy | ............ | C01B 37/08 540/464 |
| 2018/0362354 A1 | 12/2018 | Nicolas et al. | | |
| 2019/0359493 A1 | 11/2019 | Ha et al. | | |
| 2020/0062604 A1 * | 2/2020 | Kamakoti | ............ | C10G 35/095 |

FOREIGN PATENT DOCUMENTS

| | | |
|---|---|---|
| KR | 1020070041239 A | 4/2007 |
| KR | 1020080083314 A | 9/2008 |
| KR | 1020100083929 A | 7/2010 |
| KR | 1020150052680 A | 5/2015 |
| KR | 1020150104447 A | 9/2015 |
| KR | 1020160003076 A | 1/2016 |
| KR | 1020170113573 A | 10/2017 |
| KR | 1020180069731 A | 6/2018 |
| KR | 101994765 B1 | 7/2019 |
| WO | 2016126431 A1 | 8/2016 |

OTHER PUBLICATIONS

Liu et al, "Synthesis and Characterization of Hierarchical ZSM-48 zeolite", Advanced Materials Research vol. 503-504, (2012) pp. 756-759 (Year: 2012).*
Zhang et al, "Tailoring Hierarchical Zeolites with Designed Cationic Surfactantsand Their High Catalytic Performance", Chem. Asian J. 2017, 12,2711-2719 (Year: 2017).*
Ahmed. Mohamed, et al. "Stability Assessment of Redenerated Hierarchical ZSM048 . . .". Energy Fuels. 31, 14097-14103. 2017 (Year: 2017).*
Zhu, Yan et al. "Hierarchical Mesoporous Zeolites . . .". Chem. Euro. J. 17, 14618-14627 (2011) (Year: 2011).*
Liu et al., "Recent progress in the direct synthesis of hierarchical zeolites: synthetic strategies and characterization methods", Materials Chemistry Frontiers, 2017, pp. 2195-2212, vol. 1.
Pan et al., "Mesoporous EU-1 zeolite synthesized in the presence of cationic polymer", Microporous and Mesoporous Materials, 2016, pp. 245-252, vol. 235.
Wang et al., "Synthesis of nano-zeolite IM-5 by hydrothermal method with the aid of PEG and CTAB", Materials Letters, 2012, pp. 16-19, vol. 69.

* cited by examiner

*Primary Examiner* — Sheng H Davis
(74) *Attorney, Agent, or Firm* — The Webb Law Firm

(57) ABSTRACT

The present invention relates to a method for preparing hierarchical zeolites, including the steps of preparing a first mixture solution including a structure-directing agent, an alumina precursor and a pH controller; preparing a second mixture solution by injecting a silica precursor into the first mixture solution; preparing an aqueous solution including a surfactant; preparing a third mixture solution by injecting the aqueous solution into the second mixture solution; and drying and heat-treating the third mixture solution. According to the present invention, hierarchical zeolites having a uniform morphology can be prepared, and thus hierarchical zeolites having improved activity are provided.

6 Claims, 3 Drawing Sheets

[FIG. 1]
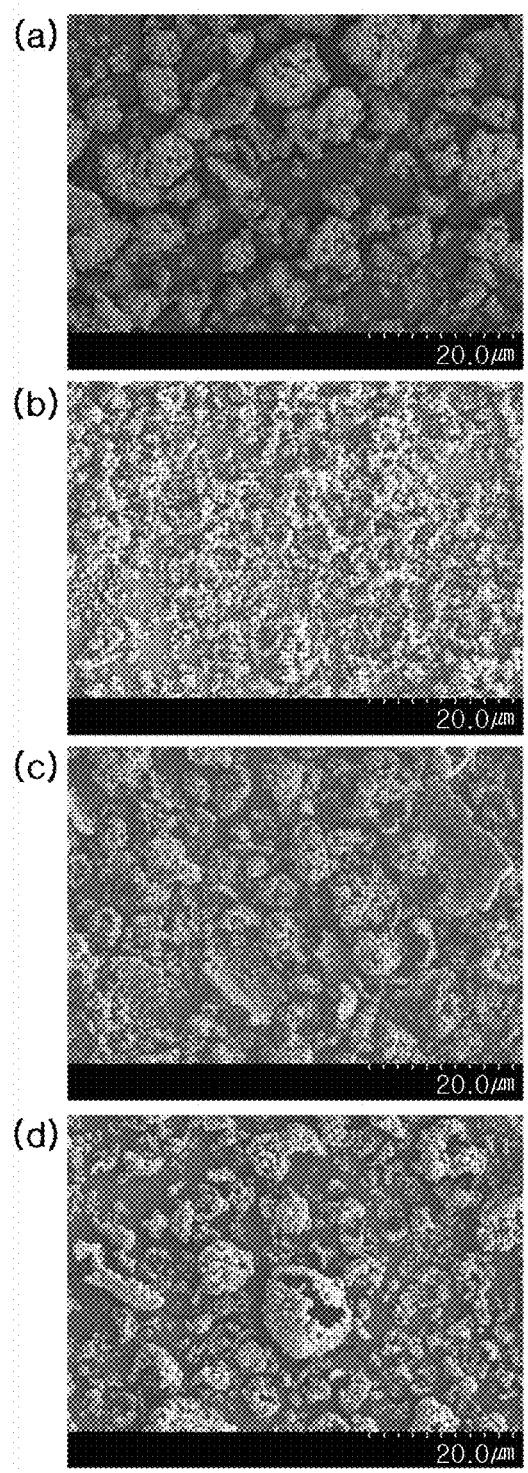

[FIG. 2]
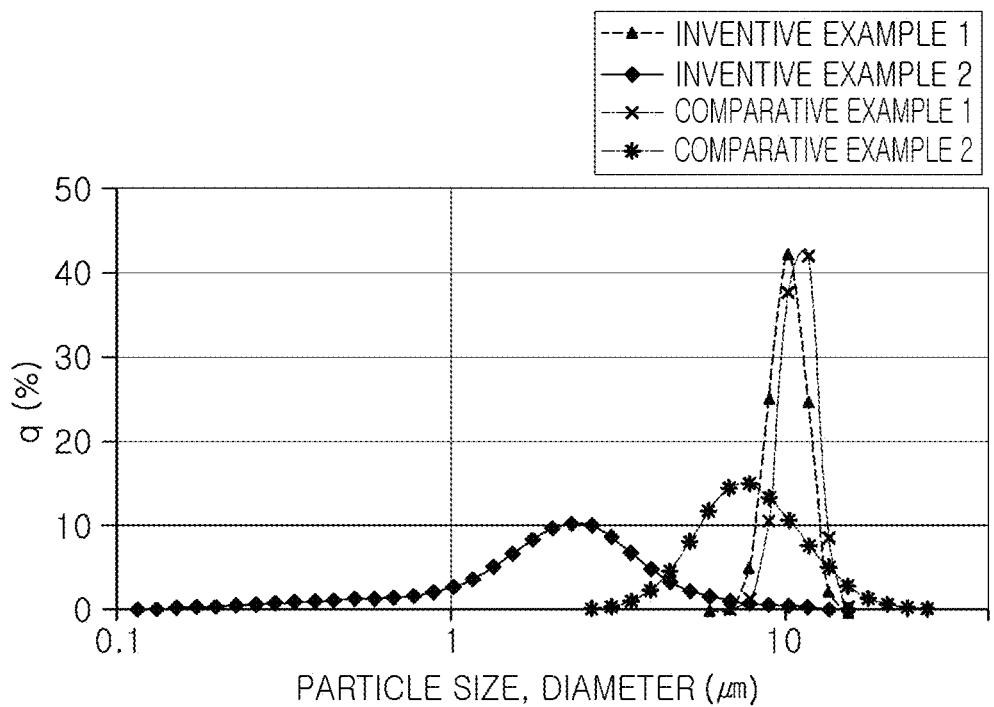

[FIG. 3]
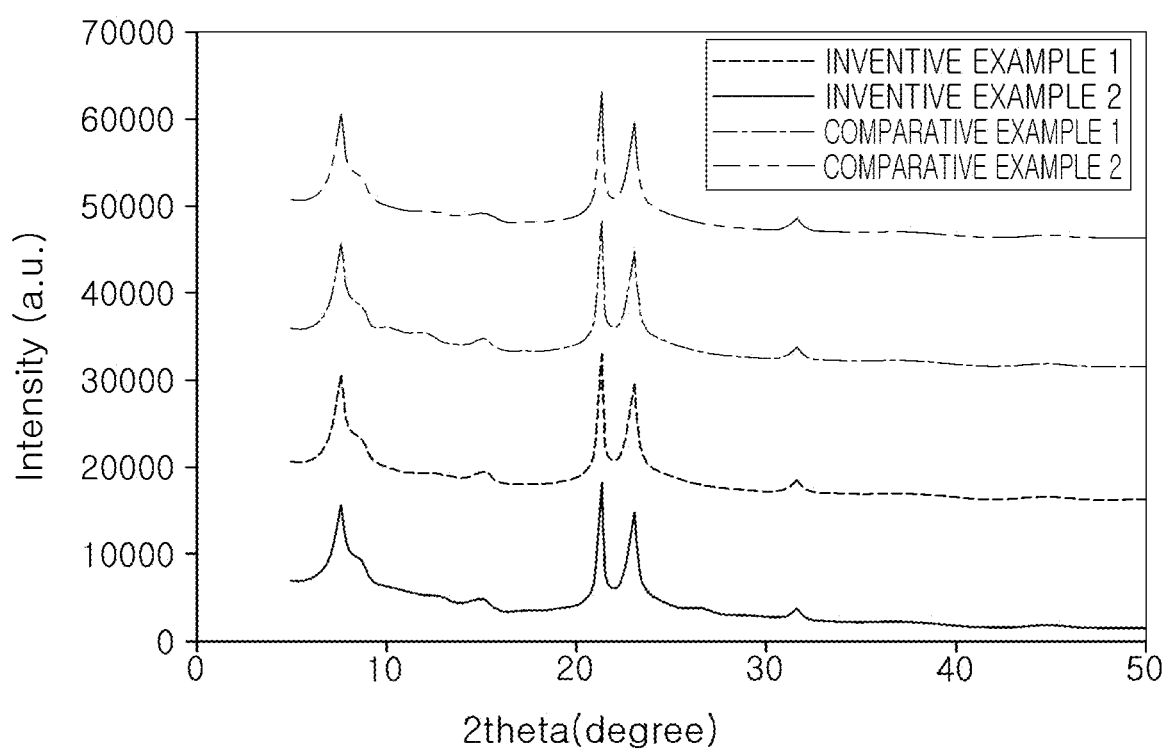

HIERARCHICAL ZEOLITES AND PREPARATION METHOD THEREFOR

CROSS-REFERENCE TO RELATED APPLICATIONS

This application is the United States national phase of International Application No. PCT/KR2019/012216 filed Sep. 20, 2019, and claims priority to Korean Patent Application No. 10-2018-0114203 filed Sep. 21, 2018, the disclosures of which are hereby incorporated by reference in their entirety.

BACKGROUND OF THE INVENTION

Field of the Invention

The present disclosure relates to hierarchical zeolites and a preparation method therefor.

Description of Related Art

Zeolites may be a microporous crystalline aluminosilicate having a tetrahedronal structure in which silicon and aluminum atoms may be co-ordinarily bonded to each other through a shared oxygen atom to form a general skeleton. Due to inherent porosity properties, wide availability, low cost, and high efficiency, the zeolites may be used in many applications.

The zeolites may be mainly used as catalysts in petrochemical cracking, in separation and removal of gases and solvents, and as ion-exchange applications in water softening, refining, removal of heavy metal, and treatment of nuclear effluent. This may be because exchangeable ions (sodium, calcium, and potassium ions) in the zeolites are relatively harmless. Further, the zeolites may be also used in other applications such as filtration, odor removal, and drying in aquaculture, agriculture, and livestock industries, etc. For example, a clinoptilolite zeolite (a typical natural zeolite) has been extensively studied as an ion exchanger, and may be also used commercially in the treatment of industrial and municipal wastewater, to lower concentrations of ammonia.

Zeolites may generally be a microporous material. In recent years, research on mesoporous zeolites, that is, zeolites having mesoporous pores having a pore size of 2 nm or more, has been conducted. Due to the development of such mesoporous zeolites, limited applications of molecular sieve materials, for example, applications of molecular sieve materials with respect to adsorption and separation of molecules having a size, larger than a pore size of microporous materials, catalytic conversion reactions, or the like, have become possible.

In order to introduce mesopores into zeolites having micropores, a method of dissolving in a basic solution has been used. However, such a method may be difficult to obtain a sample with maintaining reproducibility, and may require an additional operation(s). In addition, since the method adopts cutting the existing zeolites off, the total yield thereof may be also reduced to have poor economic efficiencies.

In the meantime, when synthesizing zeolites, a surfactant capable of introducing mesopores thereinto may be additionally added. However, when two or more surfactants are used at the same time, there are problems that different types of surfactants may not grow crystals according to their roles, and may not form crystals because they interfere with each other by mixing.

SUMMARY OF THE INVENTION

Technical Problem

An aspect of the present disclosure is to solve the above problems, and is to provide hierarchical zeolites having a uniform morphology even when two or more surfactants are used at the same time, and a method for preparing the same.

Technical Solution

According to an aspect of the present disclosure, a method for preparing a hierarchical zeolite, includes: preparing a first mixture solution containing a structure-directing agent, an alumina precursor, and a pH adjusting material; adding a silica precursor to the first mixture solution to prepare a second mixture solution; preparing an aqueous solution containing a surfactant; adding the aqueous solution to the second mixture solution to prepare a third mixture solution; and drying and heat-treating the third mixture solution.

In the method, the structure-directing agent may be included in a molar ratio of 1/120 to 1/50, relative to an amount of silica.

In the method, the surfactant may be added in a molar ratio of 1/200 to 1/50, relative to an amount of silica.

In the method, a concentration of the surfactant in the aqueous solution may be 77 mmol/L to 360 mmol/L.

In the method, the structure-directing agent may be at least one selected from the group consisting of tetramethylammonium bromide, tetramethylammonium chloride, tetramethylammonium hydroxide, tetraethylammonium bromide, tetraethylammonium chloride, tetraethylammonium hydroxide, tetraethylammonium tetrafluoroborate, hexamethonium chloride, and hexamethonium bromide.

In the method, the surfactant may be at least one selected from the group consisting of cetyltrimethylammonium bromide, cetyltrimethylammonium chloride, and cetylpyridinium chloride.

In the method, the preparing a third mixture solution may include adding the aqueous solution to the second mixture solution in a dropwise manner.

In addition, the method may be performed, without containing a seed.

According to an aspect of the present disclosure, a hierarchical zeolite prepared by the method is provided.

Advantageous Effects

According to an aspect of the present disclosure, hierarchical zeolites having a uniform morphology may be prepared, and hierarchical zeolites having improved activity may be provided.

BRIEF DESCRIPTION OF DRAWINGS

FIG. 1 shows pictures of zeolites according to Inventive Example 1 (portion a), Inventive Example 2 (portion b), Comparative Example 1 (portion c), and Comparative Example 2 (portion d) of the present disclosure, captured by a scanning electron microscope (SEM).

FIG. 2 shows a particle size distribution of zeolites according to Inventive and Comparative Examples of the present disclosure.

FIG. 3 shows an X-ray diffraction (XRD) of zeolites according to Inventive and Comparative Examples of the present disclosure.

DESCRIPTION OF THE INVENTION

Hereinafter, preferred embodiments of the present disclosure will be described with reference to various examples. However, embodiments of the present disclosure may be modified in various other forms, and the scope of the present disclosure is not limited to embodiments described below.

The present disclosure relates to hierarchical zeolites and a preparation method therefor.

Zeolites, especially ZSM-48, may be zeolites having an orthorhombic or pseudo-orthorhombic structure having a 10-membered ring of non-interconnected linear channels and an ideal size of 5.5×5.6 Å. ZSM-48 may be a material containing micropores. When mesopores are introduced thereinto, diffusion rates of feed materials thereof may increase to improve catalytic performance, and may process feed materials having a relative large molecule size.

The present inventors focused on the point that stabilization of a surfactant to be added and an addition rate of the surfactant affect a morphology of a zeolite, and came to completion of the present disclosure, when a structure-directing agent and a surfactant are used to introduce mesopores to a zeolite containing micropores as described above.

According to an aspect of the present disclosure, a method for preparing a hierarchical zeolite, including: preparing a first mixture solution containing a structure-directing agent, an alumina precursor, and a pH adjusting material; adding a silica precursor to the first mixture solution to prepare a second mixture solution; preparing an aqueous solution containing a surfactant; adding the aqueous solution to the second mixture solution to prepare a third mixture solution; and drying and heat-treating the third mixture solution, may be provided.

First, a first mixture solution containing a structure-directing agent, an alumina precursor, and a pH adjusting material may be prepared. When mixing the structure-directing agent, the alumina precursor, and the pH adjusting material to prepare the first mixture solution, the mixing may be performed sequentially or simultaneously. For example, water may be used as a solvent in the mixing.

The structure-directing agent may have a carbon number of C10 or less and an ammonium functional group, and, may be, for example, at least one selected from the group consisting of tetramethylammonium bromide, tetramethylammonium chloride, tetramethylammonium hydroxide, tetraethylammonium bromide, tetraethylammonium chloride, tetraethylammonium hydroxide, tetraethylammonium tetrafluoroborate, hexamethonium chloride, and hexamethonium bromide.

The structure-directing agent may be added in a molar ratio of 1/120 to 1/50, preferably 1/100 to 1/50, more preferably 1/80 to 1/50, relative to an amount of silica. When the structure-directing agent is present in a molar ratio of less than 1/120, relative to an amount of silica, a molar ratio of a material into which a structure is induced may be relatively low. In this case, extra silica not participating in structural formation of the zeolite may be generated to form silica crystals and the like, to reduce purity and reduce yield in overall. An excessive amount of structure-directing agent may form a different structure in the structure-directing agent to form an impurity, different from the zeolite structure to be synthesized, or even when the same structure is formed, a different morphology may be formed to reduce a purity. Therefore, the structure-directing agent is preferable not to exceed a molar ratio of 1/50, relative to an amount of silica.

The alumina precursor used in the present disclosure is not particularly limited. For example, as the alumina precursor, one or more selected from the group consisting of sodium aluminate, sodium aluminum sulfate, and aluminum may be used.

An amount of the alumina precursor used may be determined according to a silica-alumina molar ratio of the zeolite to be obtained. For example, although not limited thereto, the alumina precursor may be used such that the silica-alumina molar ratio ($SiO_2/Al_2O_3$ molar ratio) has a range of 5 to 50, preferably 10 to 40, more preferably 15 to 30.

In addition, as the pH adjusting material, a basic substance such as lithium hydroxide, sodium hydroxide, potassium hydroxide, rubidium hydroxide, cesium hydroxide, ammonium hydroxide, or the like may be used.

The pH adjuster may be added such that the first mixture solution has a range of pH 12 or more, preferably pH 12 to 14. When pH of the first mixture solution is lower than 12, the silica precursor may not be easily dissociated and thus may not participate in a reaction. In this case, silica crystals acting as impurities in a sample may be formed during the crystallization process. Therefore, the pH adjusting material may be specifically added in a molar ratio of 0.1 to 0.4, preferably 0.1 to 0.3, more preferably 0.15 to 0.25, relative to an amount of silica.

Next, a silica precursor may be added to the first mixture solution to prepare a second mixture solution. The silica precursor may be added to the first mixture solution containing the structure-directing agent, the alumina precursor, and the pH adjusting material, to form a basic structure of the zeolite.

The silica precursor is not specifically limited, and, as the silica precursor, for example, one or more selected from the group consisting of fumed silica, precipitated silica, colloidal silica, sodium silicate, tetramethyl orthosilicate, tetraethyl orthosilicate, borosilicate, and fluorosilicate may be used.

The silica precursor may be added such that a silica-water molar ratio has a range of 0.01 to 0.1, relative to an amount of water contained in a total composition for zeolite synthesis, that is, in the third mixture solution to be described later. The silica-water molar ratio is preferably 0.03 to 0.08, and most preferably 0.05 to 0.07.

Next, an aqueous solution containing a surfactant may be added to the second mixture solution to prepare a third mixture solution. The aqueous solution containing the surfactant may be added to the second mixture solution to hierarchically introduce mesopores into the zeolite.

First, the aqueous solution containing the surfactant may be prepared. In this case, a surfactant present in a form of a solution may be diluted in water and agitated to uniformly disperse, and a surfactant present in a form of a powder may be stirred to obtain a uniform solution, as the aqueous solution. A concentration of the surfactant in the aqueous solution may be 77 mmol/L to 360 mmol/L, and preferably 77 mmol/L to 230 mmol/L. When the concentration exceeds 360 mmol/L, a stabilization effect of the surfactant may not be sufficient. When the concentration is less than 77 mmol/L, a relatively large amount of water may be added to the surfactant, to decrease an amount of water in the second mixture solution required for gel formation. In this case, uniformity of the zeolite may be deteriorated.

The surfactant may have a carbon number of C11 or more and an ammonium functional group, and, may be, for example, at least one selected from the group consisting of cetyltrimethylammonium chloride, cetyltrimethylammonium bromide, and cetylpyridinium chloride.

In adding the aqueous solution containing the surfactant to the second mixture solution, the surfactant may be added in a molar ratio of 1/200 to 1/50, preferably 1/150 to 1/50, more preferably 1/120 to 1/60, relative to an amount of silica. When the surfactant is added in a molar ratio of more than 1/50, relative to an amount of silica, an amorphous material of a silica component may be produced together. In this case, there may be a problem that crystallinity and uniformity of EU-2 itself are deteriorated. When the surfactant is added in a molar ratio of less than 1/200, there may be a problem in that ions of the surfactant may not be effectively combined around a seed, and, thus, mesopores may not be effectively formed.

In this way, in preparing a zeolite including both micropores and mesopores by adding a structure-directing agent and a surfactant, a zeolite having a more uniform morphology may be obtained after stabilizing and diluting the surfactant in the aqueous solution.

In order to produce a zeolite having a uniform morphology, the aqueous solution containing the surfactant may be added to the second mixture solution in a dropwise manner. In this case, the dropwise manner may refer to, for example, a method of slowly introducing a surfactant using a dropper or a burette, for example, in a speed range of 50 cc/min or less, for example, 1 to 40 cc/min, 4 to 30 cc/min, 6 to 20 cc/min, or the like.

In a case of synthesis using the above method, it may be advantageous for the surfactant to effectively approach around a gel to have a uniform morphology. In this case, a negative charge, which may be a charge on a surface of the silica gel, may interact with a positive charge, which may be a charge on a surface of the surfactant, under the corresponding synthesis conditions. The silica gel and the surfactant may be added in a dropwise manner to interact more effectively, to obtain a uniform morphology. When added in a one pot manner, there may be a problem in that an uneven morphology is obtained because an excessive amount of surfactant is added at a time.

In drying and heat-treating the third mixture solution, the heat treatment may be performed at a reaction temperature of 140 to 190° C., preferably 150 to 180° C., and most preferably at 160 to 180° C. When the heat treatment is performed at a reaction temperature of lower than 140° C., crystallization of the hierarchical zeolite may be deteriorated, to have no or poor crystallinity. When the heat treatment is performed at a reaction temperature of higher than 190° C., over-reaction may be performed to form quartz or the like as impurities, and decompose the surfactant at high temperatures.

In addition, although the heat treatment may be performed for 48 hours or more, but when a synthesis time increases to improve crystallinity, a side effect of generating quartz may occur. Therefore, the heat treatment may be performed for 48 to 50 hours.

A method for preparing a hierarchical zeolite, according to an aspect of the present disclosure may be performed without containing a seed. In general, when a seed is not used, a zeolite in which mesopores are introduced may not be uniformly synthesized. Therefore, in general, it may be common to use a seed. According to the method of the present disclosure, both micropores and mesopores may be included without containing a seed, to stably synthesize the zeolite.

According to another aspect of the present disclosure, a hierarchical zeolite prepared by the method may be provided. The zeolite prepared by the method of the present disclosure may have a BET surface area of 260 g/m$^2$ or more, a mesopore volume of 0.20 g/cm$^3$ or more, and a size of less than 6 μm as PSD.

MODE FOR INVENTION

Example

Hereinafter, the present disclosure will be described in more detail with reference to the following Examples. The following Examples may be for describing the present disclosure in more detail, and the present disclosure is not limited the Examples.

Inventive Example 1

1.37 g of hexamethonium chloride as a structure-directing agent, 0.46 g of sodium aluminate as an alumina precursor, and 2.49 g of sodium hydroxide (NaOH) were dissolved in 46 g of deionized (DI) water to prepare a mixture solution. Then, 48.16 g of Ludox-HS40 as a silica precursor was added to the mixture solution.

4.36 g of cetyltrimethylammonium chloride (CTAC) as an organic surfactant was added to 30 g of water to prepare an aqueous solution, the aqueous solution was stirred, and the stirred aqueous solution was then added to the mixture solution in a one-pot manner. In this case, the temperature was maintained at room temperature.

A final mixture solution was added in a hydrothermal synthesis reactor coated with a Teflon material, and reacted at 160° C. for 2 days (48 hours) to obtain a zeolite. The obtained zeolite was sufficiently washed with distilled water, dried at 60° C. for 12 hours, and calcined at 550° C. for 5 hours to remove the organic surfactant CTAC, to prepare a hierarchical zeolite having both micropores and mesopores.

Inventive Example 2

1.37 g of hexamethonium chloride as a structure-directing agent, 0.46 g of sodium aluminate as an alumina precursor, and 2.49 g of sodium hydroxide (NaOH) were dissolved in 46 g of deionized (DI) water to prepare a mixture solution. 48.16 g of Ludox-HS40 as a silica precursor was added to the mixture solution. 4.36 g of cetyltrimethylammonium chloride (CTAC) as an organic surfactant was added to 30 g of water to prepare an aqueous solution, the aqueous solution was stirred, and the stirred aqueous solution was then added to the mixture solution in a dropwise manner, i.e., dropwise added to the mixture solution at a rate of 20 cc/min using a dropping funnel. In this case, the temperature was maintained at room temperature.

A final mixture solution was added in a hydrothermal synthesis reactor coated with a Teflon material, and reacted at 160° C. for 2 days (48 hours) to obtain a zeolite. The obtained zeolite was sufficiently washed with distilled water, dried at 60° C. for 12 hours, and calcined at 550° C. for 5 hours to remove the organic surfactant CTAC, to prepare a hierarchical zeolite (HEU2-Na) having both micropores and mesopores.

Comparative Example 1

1.37 g of hexamethonium chloride as a structure-directing agent, 0.46 g of sodium aluminate as an alumina precursor, and 2.49 g of sodium hydroxide (NaOH) were dissolved in 76 g of deionized (DI) water to prepare a mixture solution. Then, 48.16 g of Ludox-HS40 as a silica precursor was added to the mixture solution.

4.36 g of cetyltrimethylammonium chloride (CTAC) as an organic surfactant was added to the mixture solution in a dropwise manner. In this case, the temperature was maintained at room temperature. A final mixture solution was added in a hydrothermal synthesis reactor coated with a Teflon material, and reacted at 160° C. for 2 days (48 hours) to obtain a zeolite. The obtained zeolite was sufficiently washed with distilled water, dried at 60° C. for 12 hours, and calcined at 550° C. for 5 hours to remove the organic surfactant CTAC, to prepare a hierarchical zeolite having both micropores and mesopores.

Comparative Example 2

1.37 g of hexamethonium chloride as a structure-directing agent, 0.46 g of sodium aluminate as an alumina precursor, and 2.49 g of sodium hydroxide (NaOH) were dissolved in 76 g of deionized (DI) water to prepare a mixture solution. Then, 48.16 g of Ludox-HS40 as a silica precursor was added to the mixture solution.

4.36 g of cetyltrimethylammonium chloride (CTAC) as an organic surfactant was added to the mixture solution in a one-pot manner. In this case, the temperature was maintained at room temperature.

A final mixture solution was added in a hydrothermal synthesis reactor coated with a Teflon material, and reacted at 160° C. for 2 days (48 hours) to obtain a zeolite. The obtained zeolite was sufficiently washed with distilled water, dried at 60° C. for 12 hours, and calcined at 550° C. for 5 hours to remove the organic surfactant CTAC, to prepare a hierarchical zeolite having both micropores and mesopores.

Specific surface areas (a BET surface area ($S_{BET}$), a micropore area ($S_{micro}$) and an external surface area ($S_{ext}$)), pore volumes (a total volume ($V_{total}$) and a mesopore volume ($V_{meso}$)), and a particle size of zeolites according to the above Inventive and Comparative Examples were shown in Table 1.

TABLE 1

|      | $S_{BET}$ (m²/g) | $S_{micro}$ (m²/g) | $S_{ext}$ (m²/g) | $V_{total.}$ (cm³/g) | $V_{meso}$ (cm³/g) | Particle Size (mm) Average Value |
|------|------|------|------|------|------|------|
| IE 1 | 292 | 199 | 93 | 0.30 | 0.22 | 10.1 |
| IE 2 | 275 | 172 | 104 | 0.33 | 0.26 | 2.3 |
| CE 1 | 273 | 183 | 90 | 0.23 | 0.16 | 10.1 |
| CE 2 | 283 | 186 | 97 | 0.25 | 0.18 | 7.7 |

IE: Inventive Example,
CE: Comparative example

Referring to Table 1, it can be seen that Comparative Examples 1 and 2, not satisfying the concentration conditions of the present disclosure, had poor $V_{meso}$ characteristics, whereas Inventive Examples 1 and 2 had largely developed $V_{meso}$ that may be accessed by large molecules. Further, it can be seen that in Inventive Example 2, added in a dropwise manner, the particle size was also small, which would have a positive effect on activity of a zeolite.

While example embodiments have been shown and described above, it will be apparent to those skilled in the art that modifications and variations could be made without departing from the scope of the present disclosure as defined by the appended claims.

The invention claimed is:

1. A method for preparing a hierarchical zeolite, comprising:
   preparing a first mixture solution containing a structure-directing agent having a carbon number of C10 or less and an ammonium functional group, an alumina precursor, and a pH adjusting material;
   adding a silica precursor to the first mixture solution to prepare a second mixture solution;
   preparing an aqueous solution containing a surfactant having a carbon number of C11 or more and an ammonium function group;
   adding the aqueous solution to the second mixture solution to prepare a third mixture solution; and
   hydrothermal reaction and drying of the third mixture solution,
   wherein the structure-directing agent is added in a molar ratio of 1/120 to 1/50, relative to an amount of silica,
   wherein the surfactant is added in a molar ratio of 1/200 to 1/50, relative to an amount of silica,
   wherein a concentration of the surfactant in the aqueous solution is 77 mmol/L to 360 mmol/L, and
   wherein the hierarchical zeolite is ZSM-48.

2. The method of claim 1, wherein the structure-directing agent is at least one selected from the group consisting of tetramethylammonium bromide, tetramethylammonium chloride, tetramethylammonium hydroxide, tetraethylammonium bromide, tetraethylammonium chloride, tetraethylammonium hydroxide, tetraethylammonium tetrafluoroborate, hexamethonium chloride, and hexamethonium bromide.

3. The method of claim 1, wherein the surfactant is at least one selected from the group consisting of cetyltrimethylammonium bromide, cetyltrimethylammonium chloride, and cetylpyridinium chloride.

4. The method of claim 1, wherein the preparing a third mixture solution comprises adding the aqueous solution to the second mixture solution in a dropwise manner.

5. The method of claim 1, wherein the method is performed, without containing a seed.

6. The method of claim 1,
   wherein the structure-directing agent is at least one selected from the group consisting of hexamethonium chloride and hexamethonium bromide;
   wherein the surfactant is at least one selected from the group consisting of cetyltrimethylammonium chloride, cetyltrimethylammonium bromide, and cetylpyridinium chloride;
   wherein the structure-directing agent is added in a molar ratio of 1/120 to 1/50, relative to an amount of silica;
   wherein the surfactant is added in a molar ratio of 1/200 to 1/50, relative to an amount of silica; and
   wherein a concentration of the surfactant in the aqueous solution is 77 mmol/L to 360 mmol/L.

* * * * *

UNITED STATES PATENT AND TRADEMARK OFFICE
CERTIFICATE OF CORRECTION

PATENT NO. : 11,434,140 B2  
APPLICATION NO. : 17/277822  
DATED : September 6, 2022  
INVENTOR(S) : Seon-Ju Lim, Tae-Jin Kim and Young-Eun Cheon Page 1 of 1

It is certified that error appears in the above-identified patent and that said Letters Patent is hereby corrected as shown below:

On the Title Page

Under (71) Applicant:
Please add the second applicant name "SK ENMOVE CO., LTD."

Under (73) Assignee:
Please add the second assignee name "SK ENMOVE CO., LTD., Seoul (KR)"

Signed and Sealed this  
Fourth Day of April, 2023

Katherine Kelly Vidal  
*Director of the United States Patent and Trademark Office*